Jan. 29, 1929.  
W. H. SIDDALL  
1,700,573  
CONSTRUCTION FOR EYEGLASS FRAMES  
Filed Dec. 15, 1926
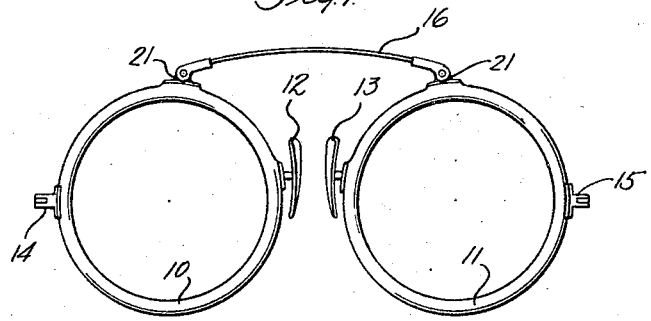
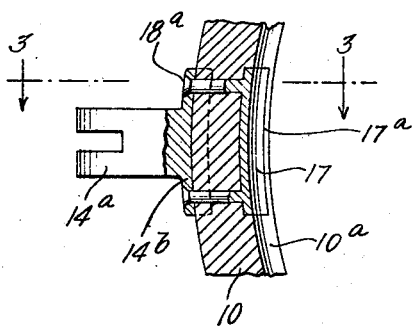
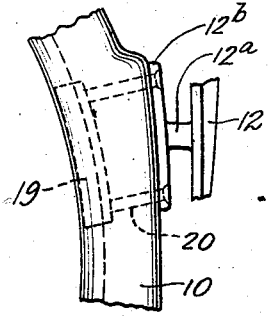
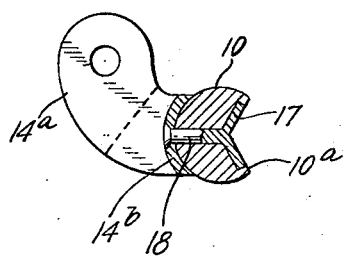
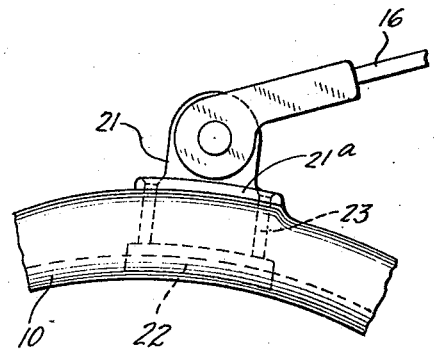
INVENTOR  
Wilbur H. Siddall  
BY  
Robert S. Blair   ATTORNEY Patented Jan. 29, 1929.

1,700,573

UNITED STATES PATENT OFFICE.

WILBUR H. SIDDALL, OF ATTLEBORO, MASSACHUSETTS, ASSIGNOR TO BAY STATE OPTICAL COMPANY, OF ATTLEBORO, MASSACHUSETTS, A CORPORATION OF MAINE.

CONSTRUCTION FOR EYEGLASS FRAMES.

Application filed December 15, 1926. Serial No. 154,920.

This invention relates to construction for eyeglass frames and more particularly to construction for eyeglass frames wherein there are employed non-metallic parts and metallic parts.

One of the objects of the invention is to provide a construction of the above nature wherein the metal parts and the non-metallic parts are secured together in a highly efficient manner. Another object is to provide a strong and dependable means for securing metal parts to non-metallic parts such as celluloid rims. Another object is to provide a construction of the above nature which is neat in appearance. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which is shown one or more of the various possible embodiments of this invention, Figure 1 is a front elevation of an eyeglass frame;

Figure 2 is a sectional view in enlarged detail showing the fastening to the rim of the parts to which the temple bars are connected;

Figure 3 is a section take along the line 3—3 of Figure 2;

Figure 4 shows in enlarged detail the fastening of a nose piece to the rim, and

Figure 5 shows in enlarged detail the fastening of a bridge to the rim.

Similar reference characters refer to similar parts throughout the several views of the drawing.

Referring now to the drawing in detail, there are shown the rims 10 and 11 of an eyeglass frame. These rims are made of a nonmetallic material such as celluloid or other material having similar characteristics and employed in the manufacture of eyeglass frames or frame parts.

The rims 10 and 11 are shown provided with nose pieces 12 and 13. At 14 and 15 are shown the outwardly projecting parts to which the temple bars are to be connected. The rims of this eyeglass frame are shown connected by a spring bridge 16 which, as is well known, is adapted to urge the two rims toward each other and hold the nose pieces 12 and 13 in against the nose of the wearer. It is to be understood that the particular arrangement and style of nose pieces and bridge shown in the drawings are shown only to illustrate a possible construction, and that the features of this invention are not limited to this particular style of eyeglass frame.

The parts 14 and 15, to which the temple bars are to be connected, are of metal. The part 14 is shown more clearly in Figures 2 and 3 and is seen therein to comprise an outwardly projecting lug portion $14^a$ and a plate-like portion $14^b$ which rests against the outer peripheral surface of the non-metallic rim 10. It will be understood that these parts may take various shapes, for example, the portion $14^b$ may extend around the celluloid rim to a greater or lesser extent. This invention deals with the problem of securing a metal member such as the part 14 to the nonmetallic rim or other non-metallic part in a strong and dependable manner.

Still referring to Figures 2 and 3, there is shown resting against the inner side of the rim a metal plate 17. This plate rests in the V-shaped groove $10^a$ which receives the edge of the lens, and is preferably set into the celluloid so that its surface is substantially flush with the celluloid surface. The edges $17^a$ of the plate preferably do not come to the edge of the rim so that the plate is substantially not visible when the lenses are fitted into place. As shown in Figure 3, the plate 17 may be bent to a V-shape to correspond with the shape of the lens groove.

Projecting from the inner side of the plate 17 are a plurality of rivet-like members 18, shown herein as two in number. These rivets 18 are preferably formed integrally with the plate 17. They extend through the celluloid or other non-metallic material of the rim, their ends passing through the plate-like portion $14^b$ of the member 14 and being headed over against the outer surface thereof as shown at 18ª. The heads 18ª are preferably countersunk in the part 14ᵇ so that the surfaces are substantially flush.

The construction just described provides a fastening of the part 14 to the metallic rim which is distinctly advantageous. The rivets are headed over against metal so that they cannot pull out. The portion of the non-metallic material between the part 14ᵇ and the plate 17 is securely gripped when the rivets are headed over. The construction is essentially strong and durable and at the same time it has no features to detract from the pleasing appearance of the eyeglass frame.

The form of connection above described is equally applicable to securing metal nose pieces or a metal bridge to the non-metallic eyeglass rims. In Figure 4 there is shown the nose piece 12 which, in this instance, is mounted at the end of a shank portion 12ª which projects outwardly from a plate portion 12ᵇ. This plate portion 12ᵇ rests against the outer peripheral surface of the non-metallic rim and, in Figure 4, there is shown in dotted lines a plate 19 with rivets 20, similar to the plate 17 and rivets 18 previously described. The plate 19 rests against the inner surface of the rim opposite to the plate 12ᵇ and the rivets 20, preferably formed integrally with the plate 19, project through the non-metallic material and are headed into countersunk openings in the plate portion 12ᵇ.

In Figure 5 is shown the spring bridge 16 and the metal part 21 to which it is secured, this metal part 21 being fastened to the non-metallic rim 10. A metal plate 22, similar to the plates 17 and 19, rests against the inner side of the rim and rivets 23, similar to the rivets 18 and 20, pass therefrom through the non-metallic material and are headed against the outer surface of the plate-like portion 21ª of the metal member 21.

From the foregoing, it will be seen that there is herein provided a means for connecting a metal part to a non-metallic part, in building eyeglass frames, which achieves distinct practical advantages. The invention is applicable to a wide range of use, advantages being achieved by its adoption in various eyeglass constructions wherein metal parts such as those herein described are secured to celluloid rims or the like.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In construction for eyeglass frames, in combination, a frame member of non-metallic material, a metal member resting against the surface of said non-metallic member, a metal plate member resting against the surface of said non-metallic member on the side thereof opposite said first metal member, and metal members passing through said non-metallic member between said first metal member and said metal plate, said last metal members being formed integral with said metal plate and the ends thereof passing through said first metal member and being riveted over to secure said first metal member in place upon said non-metallic member.

2. In construction for eyeglass frames, in combination, a frame member of non-metallic material, a metal member resting against said non-metallic member, and means for securing said metal member in place upon said non-metallic member, said means comprising a metal plate having formed integrally therewith a plurality of spaced rivet-like members, said rivet-like members passing through said non-metallic material and the ends thereof passing through said first metal member and being headed over against the outer surface thereof.

3. In construction for eyeglass frames, in combination, a rim member of non-metallic material, a metal member resting against the peripheral surface of said rim member, and means securing said metal member in place comprising a metal plate resting against the inner surface of said rim and a plurality of rivets passing through said rim and connecting said metal member and said metal plate, said rivets being formed integrally with one of said metal members and being headed against the outer surface of the other of said metal members.

4. In construction for eyeglass frames, in combination, a rim member of non-metallic material, a metal member resting against the peripheral surface of said rim member, and means securing said metal member in place comprising a metal plate resting against the inner surface of said rim and a plurality of rivets passing through said rim and connecting said metal member and said metal plate, said rivets being formed integrally with said metal plate and being headed over against the outer surface of said first metal member, the heads being countersunk therein and substantially flush with the surface thereof.

5. In construction for eyeglass frames, in combination, a rim member having on its inner side a groove for receiving the edge of a lens, a metal member resting against the outer side of said rim member, a metal plate member resting in said groove, and means formed integrally with said plate passing through said rim member and connected to said outer member to clamp said rim between said two metal members.

6. In construction for eyeglass frames, in combination, a rim member having on its inner side a groove for receiving the edge of a lens, a frame member having a plate-like part resting against the outer surface of said rim and a part projecting outwardly from a middle portion of said plate-like part, a plate-like member resting in said groove on the inner side of said rim, and securing means formed integrally with said second plate-like member passing through said rim member and through said first plate-like part on either side of said projecting part.

In testimony whereof, I have signed my name to this specification this 29th day of November, 1926.

WILBUR H. SIDDALL.